(12) United States Patent
Lu et al.

(10) Patent No.: US 8,240,138 B2
(45) Date of Patent: Aug. 14, 2012

(54) SYSTEM AND METHOD FOR REDUCING PARTICULATE MATTER EMISSION IN DIESEL EXHAUST GAS

(75) Inventors: Shuguang Lu, Troy, MI (US); Roy Primus, Niskayuna, NY (US); William Douglas Glenn, Erie, PA (US)

(73) Assignee: General Electric Company, Schenectady, NY (US)

( * ) Notice: Subject to any disclaimer, the term of this patent is extended or adjusted under 35 U.S.C. 154(b) by 922 days.

(21) Appl. No.: 11/838,299

(22) Filed: Aug. 14, 2007

(65) Prior Publication Data
US 2009/0044531 A1    Feb. 19, 2009

(51) Int. Cl.
*F01N 3/00* (2006.01)
*F01N 3/02* (2006.01)
*B01D 46/00* (2006.01)
*B01D 50/00* (2006.01)

(52) U.S. Cl. ............... 60/297; 60/311; 95/287; 422/169

(58) Field of Classification Search ............ 60/273, 60/297, 311, 299, 301; 422/169, 171, 177; 95/285, 286, 287
See application file for complete search history.

(56) References Cited

U.S. PATENT DOCUMENTS

| | | | |
|---|---|---|---|
| 4,520,624 A | 6/1985 | Kiyota | |
| 5,753,339 A * | 5/1998 | Hawes | 428/116 |
| 6,013,599 A * | 1/2000 | Manson | 502/340 |
| 6,301,887 B1 * | 10/2001 | Gorel et al. | 60/605.2 |
| 6,438,948 B2 | 8/2002 | Ono et al. | |
| 6,758,037 B2 | 7/2004 | Terada et al. | |
| 6,912,848 B2 | 7/2005 | Bedapudi | |
| 2003/0097834 A1 * | 5/2003 | Gabe et al. | 60/297 |
| 2003/0196430 A1 | 10/2003 | Brown et al. | |
| 2004/0103645 A1 | 6/2004 | Bedapudi | |
| 2004/0123573 A1 * | 7/2004 | Ichikawa et al. | 55/523 |
| 2004/0131512 A1 * | 7/2004 | Abe et al. | 422/180 |
| 2004/0142145 A1 * | 7/2004 | Hashimoto et al. | 428/116 |
| 2004/0258582 A1 * | 12/2004 | Miwa et al. | 422/177 |
| 2005/0126140 A1 * | 6/2005 | Ito et al. | 55/523 |

(Continued)

FOREIGN PATENT DOCUMENTS

EP        1382374 A       1/2004

(Continued)

OTHER PUBLICATIONS

"Flow Velocity Profiles", archived Sep. 8, 2003.*

*Primary Examiner* — Thomas Denion
*Assistant Examiner* — Audrey K Bradley
(74) *Attorney, Agent, or Firm* — GE Global Patent Operation; John A. Kramer

(57) ABSTRACT

An aftertreatment system is provided for reducing particulate matter emission and chemical emissions in diesel engine exhaust gas. The system includes a diesel particulate filter including a plurality of diesel particulate filter units configured to engage respective cross-sectional regions of the diesel engine exhaust gas including particulate matter. Each diesel particulate filter unit includes a plurality of channels aligned in a flow direction of the diesel engine exhaust gas. The channels are selectively configured with a distinct cross-sectional area density. Additionally, each diesel particulate filter unit includes a plurality of walls separating adjacent channels of the plurality of channels, where the walls have a respective thickness. A plurality of pores are configured to vacate a distinct ratio of the area of the walls.

1 Claim, 10 Drawing Sheets

U.S. PATENT DOCUMENTS

| | | | |
|---|---|---|---|
| 2005/0188686 A1* | 9/2005 | Saito et al. | 60/297 |
| 2005/0235622 A1* | 10/2005 | Cutler et al. | 55/523 |
| 2006/0236692 A1* | 10/2006 | Kolavennu et al. | 60/602 |
| 2007/0089404 A1* | 4/2007 | Gross et al. | 60/286 |
| 2007/0089707 A1* | 4/2007 | Weber et al. | 123/316 |
| 2007/0175206 A1* | 8/2007 | Mital et al. | 60/286 |
| 2007/0220867 A1* | 9/2007 | Clerc et al. | 60/288 |
| 2008/0110341 A1* | 5/2008 | Ketcham et al. | 95/274 |

FOREIGN PATENT DOCUMENTS

| | | | |
|---|---|---|---|
| EP | 1415779 A | | 5/2004 |
| EP | 1440722 A | | 7/2004 |
| EP | 1484483 A | | 12/2004 |
| EP | 1491248 A | | 12/2004 |
| EP | 1536109 A | | 6/2005 |
| EP | 1882829 A | | 1/2008 |
| FR | 2865767 A | | 8/2005 |
| FR | 2907162 A | | 4/2008 |
| GB | 2384728 A | | 8/2003 |
| GB | 2393404 A | | 3/2004 |
| KR | 2004105279 A | * | 12/2004 |
| WO | WO 2005/077075 A | | 8/2005 |
| WO | WO 2005/088094 A | | 9/2005 |
| WO | WO 2008/062119 A | | 5/2008 |

* cited by examiner

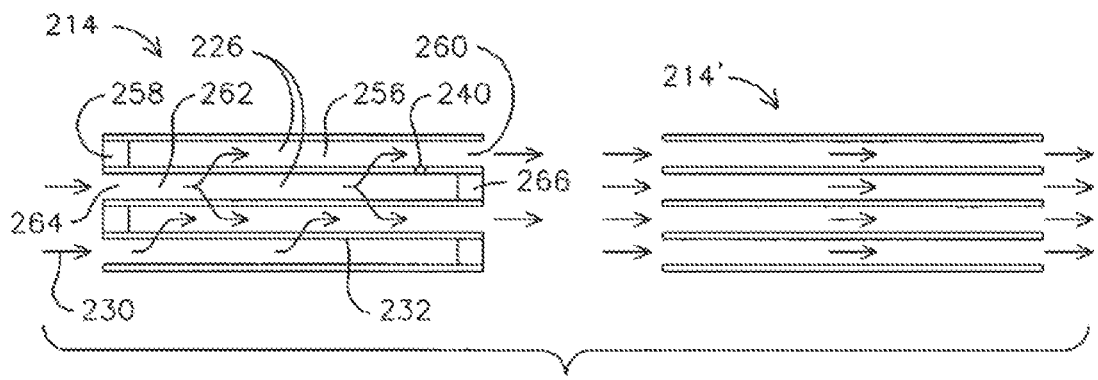
FIG. 12
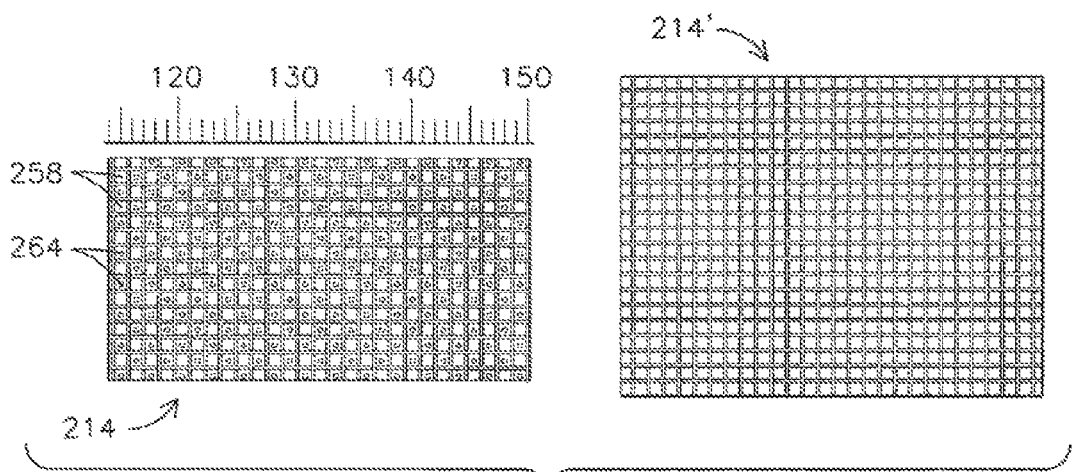
FIG. 13
| Cell Density, cpsi | 100 | 200 | 300 | 400 | 500 |
|---|---|---|---|---|---|
| Matrix Density, kg/m$^3$ | 340 | 550 | 630 | 740 | – |
| Matrix Specific Heat, J/K cm$^3$ | 0.17 | 0.28 | 0.32 | 0.37 | – |
| Uncoated Substance | | | | | |
| Hydraulic Diameter, mm | 2.192 | 1.419 | 1.211 | 0.997 | 0.914 |
| Open Area, % | 96 | 94 | 93 | 92 | 91 |
| Geometric Surface Area, m$^2$/l | 1.75 | 2.65 | 3.07 | 3.67 | 3.97 |
| Coated Substrate | | | | | |
| Hydraulic Diameter, mm | 2.35 | 1.60 | 1.34 | 1.08 | 0.998 |
| Open Area, % | 89 | 83 | 81 | 78 | 76 |
| Geometric Surface Area, m$^2$/l | 1.52 | 2.07 | 2.41 | 2.89 | 3.05 |
FIG. 15

| Configuration | 200/12 | 300/8 | 400/7 | 236/11.5 | 200/8 | 400/4 |
|---|---|---|---|---|---|---|
| Cell Shape | square | square | square | triangular | square | square |
| Material Composition | EX-20 | EX-20 | EX-20 | EX-32 | EX-20 | EX-20 |
| Cell Density, cpsi | 200 | 300 | 400 | 236 | 200 | 400 |
| Wall Thickness, inch -mm | 0.012 0.30 | 0.008 0.21 | 0.007 0.18 | 0.0115 0.29 | 0.008 0.21 | 0.004 0.10 |
| Open Frontal Area, % | 69 | 74 | 74 | 64 | 79 | 83 |
| Geometric Surface Area, in²/in³ -m²/l | 47 1.85 | 60 2.36 | 69 2.72 | 56 2.21 | 50 1.97 | 73 2.87 |
| Hydraulic Diameter, inch -mm | 0.059 1.50 | 0.050 1.27 | 0.043 1.09 | 0.046 1.17 | 0.063 1.60 | 0.046 1.17 |
| Compressive Strength, B-Axis, psi -MPa | 980 6.76 | 750 5.17 | 525 3.62 | 915 6.81 | 150 1.03 | 150 1.03 |
| Axial MOR, psi | 625 | 540 | 440 | n/a | n/a | n/a |
| Isostatic Strength (9.5"x6"), psi | 1590 | 1100 | 1040 | n/a | n/a | n/a |
| Density, g/in³ -g/cm³ | 8.7 0.53 | 7.3 0.45 | 7.3 0.45 | 9.6 0.59 | 5.69 0.347 | 4.57 0.279 |

SYSTEM AND METHOD FOR REDUCING PARTICULATE MATTER EMISSION IN DIESEL EXHAUST GAS

This application is related to U.S. patent application Ser. Nos. 11/838,277 and 11/838,296, filed concurrently herewith. Each of the foregoing applications is incorporated by reference herein in their entirety.

FIELD OF THE INVENTION

This invention relates to diesel exhaust gas, and more particularly to a system and method for reducing particulate matter emission in diesel exhaust gas.

BACKGROUND OF THE INVENTION

Diesel engines have been extensively used in various applications, such as locomotives, for example. Diesel engine exhaust gas is typically outputted from the engine (or a turbocharger connected to the diesel engine) and directed to an output, such as to the atmosphere for a locomotive diesel engine, for example.

Conventional applications employing diesel engines, such as locomotives, do not have optimized flow distributions necessary for effectively adapting aftertreatment devices and have them operate at peak performance. For example, as illustrated in the exemplary embodiment of FIG. 1, conventional diesel locomotives may expel diesel exhaust gas 150 with a non-uniform cross-sectional profile 151 representative of the flow rate and/or particulate matter within the diesel exhaust gas. As shown in FIG. 1, the exemplary non-uniform cross-sectional profile 151 is greater at the center 154 of the cross-section, while it is reduced at the outside 152 of the cross-section, demonstrating a non-uniform flow rate and/or high particulate matter within the center cross-section of the diesel exhaust gas expelled from the diesel engine, for example. As further illustrated in FIG. 1, the conventional system may position an aftertreatment device 156, such as a diesel particulate filter, for example, in the path of the expelled diesel exhaust gas 150, in an effort to filter or chemically alter the diesel exhaust gas. However, since the flow distribution of diesel exhaust gas is non-uniform at the cross-section 154, and the aftertreatment device 156 provides equal resistance across its cross-section, a majority of the diesel exhaust gas 150 at the center cross-section 154 may flow through or load the aftertreatment device in a manner that reduces effectiveness and reliability of the aftertreatment device(s).

Accordingly, it would be advantageous to provide a diesel engine exhaust system, including aftertreatment devices, to distribute the flow rate of diesel exhaust gas and the particulate matter uniformly across the cross-sectional profile of the aftertreatment devices, to enhance efficiency and reliability of the aftertreatment system.

BRIEF DESCRIPTION OF THE INVENTION

One embodiment of the present invention provides a system for reducing particulate matter and/or chemically altering emissions in diesel engine exhaust gas. The system includes a diesel particulate filter including a plurality of diesel particulate filter units configured to engage a respective cross-sectional region of the diesel engine exhaust gas including particulate matter. Each diesel particulate filter unit includes a plurality of channels aligned in a flow direction of the diesel engine exhaust gas. The channels are selectively configured with a distinct cross-sectional area density. Additionally, each diesel particulate filter unit includes a plurality of walls separating adjacent channels of the plurality of channels, where the walls have a respective thickness. A plurality of pores are configured to vacate a distinct ratio of the area of the walls.

Another embodiment of the present invention provides a method for reducing particulate matter emission in diesel engine exhaust gas. The method includes providing a diesel particulate filter including a plurality of diesel particulate filter units. The providing step includes selectively configuring a distinct cross-sectional area density of a plurality of channels of each diesel particulate filter unit. The providing step further includes separating adjacent channels of the plurality of channels with a respective wall, where each wall of the diesel particular filter unit has a respective thickness. The providing step further includes vacating a distinct ratio of the area of each wall within the diesel particulate filter unit with a plurality of pores. The providing step further includes aligning the plurality of channels of each diesel particulate filter unit in a direction of the diesel engine exhaust gas. Additionally, the method includes engaging a respective cross-sectional region of the diesel engine exhaust gas including particulate matter with a respective diesel particulate filter unit of the diesel particulate filter.

Another embodiment of the present invention provides an aftertreatment system for chemically altering the chemical emissions in engine exhaust gas. The aftertreatment system includes an aftertreatment substrate configured to engage a respective cross-sectional region of the engine exhaust gas including the chemical emissions. The aftertreatment system further includes a catalyst component configured to coat the aftertreatment substrate. The aftertreatment substrate, with the catalyst component coating is configured to reduce particular chemical emissions in the engine exhaust gas as the engine exhaust gas passes through the aftertreatment substrate.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 12 depicts a schematic side view of an exemplary embodiment of a system for reducing particulate matter emission in engine exhaust gas;

FIG. 13 depicts a schematic end view of an exemplary embodiment of a system for reducing particulate matter emission in engine exhaust gas; and FIG. 14 is a first table (table 1) and FIG. 15 is a second table (table 2), both showing exemplary parameters of SCR components used in an aftertreatment system.

DETAILED DESCRIPTION OF THE INVENTION

Figure 1:
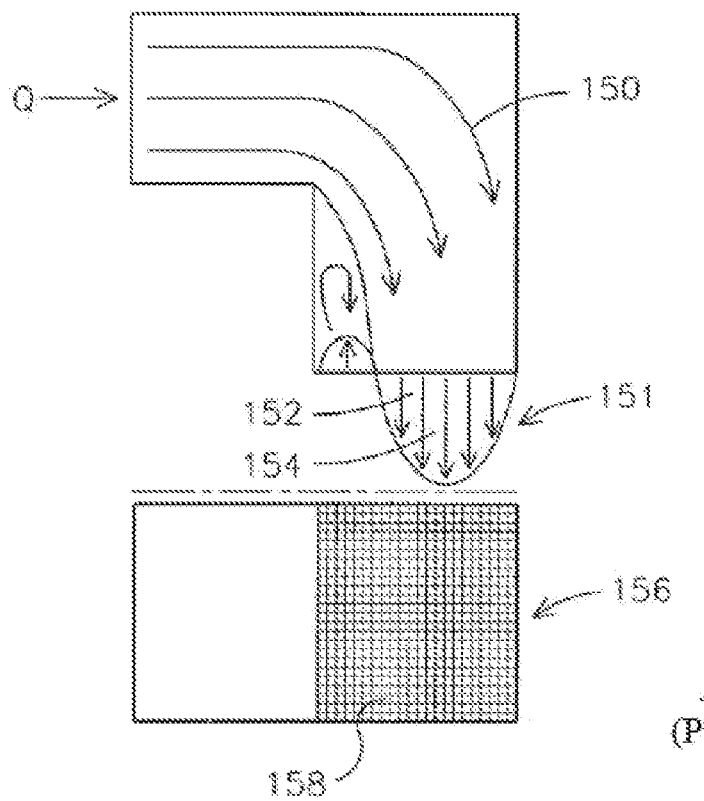
FIG. 1 depicts a schematic top view of a conventional diesel exhaust flow distribution and a schematic end view of a conventional diesel particulate filter.

Reference will now be made in detail to the embodiments consistent with the invention, examples of which are illustrated in the accompanying drawings. Wherever possible, the same reference numerals used throughout the drawings refer to the same or like parts.

Figure 2:
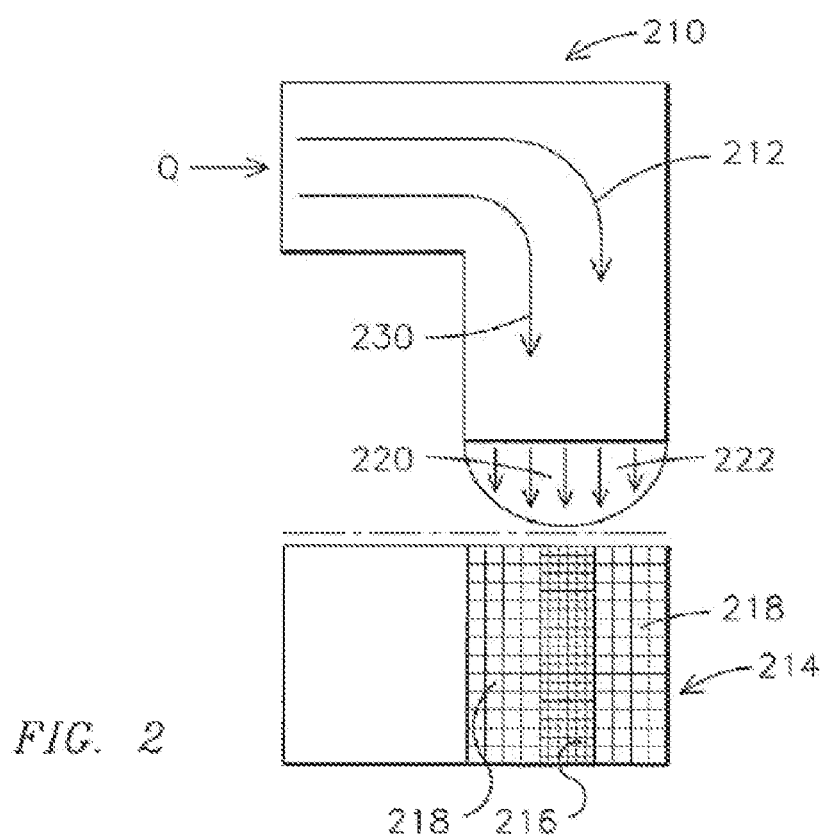
FIG. 2 depicts a schematic top view of an exemplary embodiment of a diesel exhaust flow distribution and a schematic end view of an exemplary embodiment of a diesel particulate filter in accordance with the present invention.

As illustrated in the exemplary embodiment of FIG. 2, a system 210 is illustrated to reduce particulate matter emission in diesel engine exhaust gas 212. Aftertreatment systems are used to reduce particulate matter within the diesel engine exhaust gas, chemically alter the engine exhaust gas, or perform any other operation appreciated by one of skill in the art, to reduce any non-uniformity in the exhaust flow. One example of an aftertreatment system is a diesel particulate filter, and will be discussed in the following exemplary embodiments. Another example of an aftertreatment system is catalyst substrates, and they will be discussed in the embodiments following those embodiments discussing the diesel particulate filter. Although the embodiments of the present invention discuss diesel engine exhaust gas from a diesel engine, the embodiments of the present invention may be applied to any exhaust gas (diesel or non-diesel) from an internal combustion engine, such as from a locomotive or any vehicle or stationary application, for example.

As discussed in the embodiments of the present invention below, the diesel engine exhaust gas 212 is expelled from a locomotive diesel engine 211. However, the embodiments of the present invention encompass a system to reduce exhaust emissions in diesel engine exhaust gas emitted from a diesel engine other than a locomotive diesel engine, and further encompass a system to reduce exhaust emission in engine exhaust gas from a non-diesel engine, whether the engine is used for a locomotive or non-locomotive application.

As illustrated in the exemplary embodiment of FIG. 2, the system 210 includes a diesel particulate filter 214 which is positioned in the flow path 230 of the emitted diesel exhaust gas 212 from the locomotive engine 211, and is used to filter and/or trap particulate matter and/or chemically alter emissions within the diesel exhaust gas 212. The diesel particulate filter 214 includes a plurality of diesel particulate filter units 216,218 configured to engage respective cross-sectional regions 220,222 of the diesel engine exhaust gas 212.

As illustrated in FIG. 2, the flow rate of the diesel exhaust gas 212 is maximum proximate to a center cross-sectional region 220, and is minimal proximate to outer cross-sectional regions 222 of the diesel engine exhaust gas 212. A center diesel particulate filter unit 216 is positioned proximate to the center of the diesel particulate filter 214. The center diesel particulate filter unit 216 may provide maximum resistance to the maximum flow rate of the center cross-sectional region 220 of the diesel exhaust gas 212, to equalize the flow rate of diesel exhaust gas 212 through the diesel particulate filter 214. Although FIG. 2 illustrates one center diesel particulate filter, more than one center diesel particulate filter may be used, and may be positioned at other locations than the center of the diesel particulate filter, based upon the maximum flow rate of the diesel exhaust gas. Thus, for example, the diesel engine exhaust gas may have a maximum flow rate at an arbitrary first cross-sectional region (not necessarily the center), and a minimum flow rate at an arbitrary second cross-sectional region (not necessarily at an outer portion). A first diesel particulate filter unit which provides maximum resistance may be positioned proximate to the first cross-sectional region, and a second diesel particulate filter (which provides minimum resistance) may be positioned proximate to the second cross-sectional region.

As illustrated in FIG. 2, a pair of outer diesel particulate filter units 218 are positioned proximate to the respective outer portions of the diesel particulate filter 214. The outer diesel particulate filter units 218 provide minimum resistance to the minimum flow rate of the outer cross-sectional regions 222 of the diesel exhaust gas 212, to equalize the flow rate of diesel exhaust gas through the diesel particulate filter 214. Although FIG. 2 illustrates a pair of outer diesel particulate filter units, a single continuous outer diesel particulate filter unit or more than two outer diesel particulate filter units may be used.

The cross-sectional area of the diesel particulate filter 214 including the plurality of the diesel particulate filter units 216,218 is depicted as smaller than the cross-sectional area 220,222 of the diesel exhaust gas including the plurality of cross-sectional regions. However, the cross-sectional area of the diesel particulate filter may be equal to, greater than or less than the cross-sectional area of the diesel exhaust gas. Additionally, the maximum resistance provided by the center diesel particulate filter unit 216 is configured to provide increased diesel exhaust flow to the outer diesel particulate filter unit 218. By providing increased diesel exhaust flow to the outer diesel particulate filter units 218, the system 210 encourages even diesel exhaust flow over the diesel particulate filter 214, and thus, maximizing the effectiveness and reliability of the diesel particulate filter 214.

FIGS. 12 and 13 illustrate exemplary embodiments of a wall-flow diesel particulate filter 214 and a flow-through diesel particulate filter 214'. The diesel particulate filter 214 illustrated in the exemplary embodiment of FIGS. 12 and 13 is an example of an aftertreatment system, and similar examples may be constructed for wall-flow diesel particulate filters, to chemically reduce any or all species in the diesel engine exhaust, such as hydrocarbons, CO, nitrous dioxide, and other chemicals appreciated by one of skill in the art, as further discussed below in additional embodiments of the present invention. As illustrated in FIG. 12, a diesel particulate filter unit 216 includes a plurality of channels 226 aligned in a flow direction 230 of the diesel engine exhaust gas 212. The channels 226 of each diesel particulate filter unit 216 are selectively configured with a distinct cross-sectional area density. Thus, as illustrated in FIG. 2, the cross-sectional area density of the channels of the center diesel particulate filter 216 is greater than the cross-sectional area density of the channels of the outer diesel particulate filter 218. The cross-sectional area density of a diesel particulate filter unit may be directly proportional to its resistance to a cross-sectional region of diesel exhaust gas. However, the cross-sectional area density of the channels may be the same for different diesel particulate filter units, or may be non-uniform across a diesel particulate filter unit.

As further illustrated in the exemplary embodiment of FIG. 12, a plurality of walls 232 are positioned to separate adjacent channels 226 of the diesel particulate filter unit 216. The walls 232 of the diesel particulate filter unit 216 are designed with a respective thickness. The wall thickness of the center diesel particulate filter unit 216 is greater than the wall thickness of the outer diesel particulate filter unit 218. The respective wall thickness of a diesel particulate filter unit may be directly proportional to its resistance to a cross-sectional region of diesel exhaust gas. However, the wall thickness may be the same for different diesel particulate filter units, or may be non-uniform across a diesel particulate filter unit.

As further illustrated in FIG. 12, a plurality of pores 240 are positioned within the plurality of walls 232, and the pores 240 are configured to vacate a distinct ratio of the area of the walls 232. The pores ratio of the walls of the center diesel particulate filter 216 is lower than the pores ratio of the walls of the outer diesel particulate filter 218. The pores ratio of the walls of a diesel particulate filter may be inversely proportional to its resistance to a cross-sectional region of diesel exhaust gas. However, the pores ratio may be the same for different diesel particulate filter units, or may be non-uniform across a diesel particulate filter unit.

As further illustrated in FIGS. 12 and 13, the plurality of channels 226 of the diesel particulate filter unit 216 include a plurality of first channels 256 with a blocked inlet 258 and an open outlet 260. Additionally, the plurality of channels 226 include a plurality of second channels 262 with an open inlet 264 and a blocked outlet 266. Each first channel 256 is positioned adjacent to a second channel 262, and each second channel 262 is positioned adjacent to a first channel 256. Although the first channel and second channel are illustrated in FIG. 12 with alternating blocked inlet/open inlet and blocked outlet/open outlet, each diesel particulate filter unit may include one or more channels with a blocked/open inlet and blocked/open outlet which is out of sequence with its adjacent channels.

During operation of the system 210, upon a respective cross-sectional region 220 of the diesel exhaust gas 212 entering a second channel 262 of a diesel particular filter unit 216, the diesel exhaust gas is configured to pass through one of the walls 232 separating the plurality of first channels 256 and plurality of second channels 262. The diesel exhaust gas 212 subsequently passes into a first channel 256 and exits through the open outlet 260 of the first channel 256 to the atmosphere. However, various other paths may be taken by the diesel exhaust gas 212 through the diesel particulate filter 216. Upon the diesel exhaust gas 212 passing from the second channel 262, through the wall 232 and into the first channel 256, particulate matter of the diesel exhaust gas 212 is trapped within the pores 240 of the wall.

In designing each diesel particulate filter unit 216,218, the selective cross-sectional area density of the plurality of channels, the respective wall thickness and the ratio of pores within the walls is selectively determined based upon a flow rate of the respective cross-sectional region 220,222 of the diesel exhaust gas 212 which is expected to pass over the respective diesel particulate filter unit 216,218. The plurality of diesel particulate filter units 216,218 may be comprised of silicon carbide, cordierite material, or any other material, or combination of materials appreciated by one of skill in the art.

Figure 5:
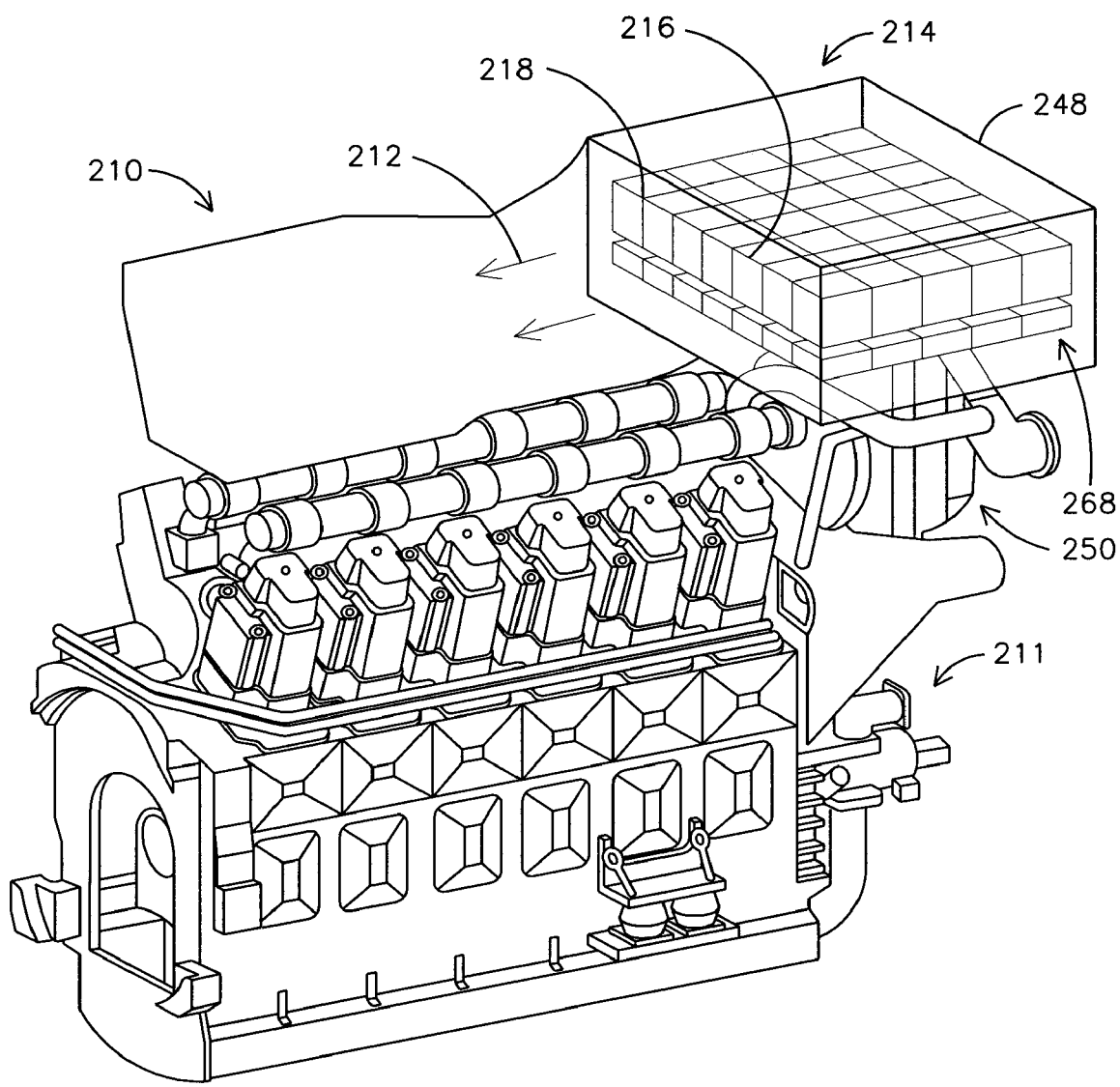
FIG. 5 depicts an isolated perspective view of an exemplary embodiment of a diesel engine among a system for removing particulate matter from a diesel particulate filter in accordance with the present invention.
Figure 6:
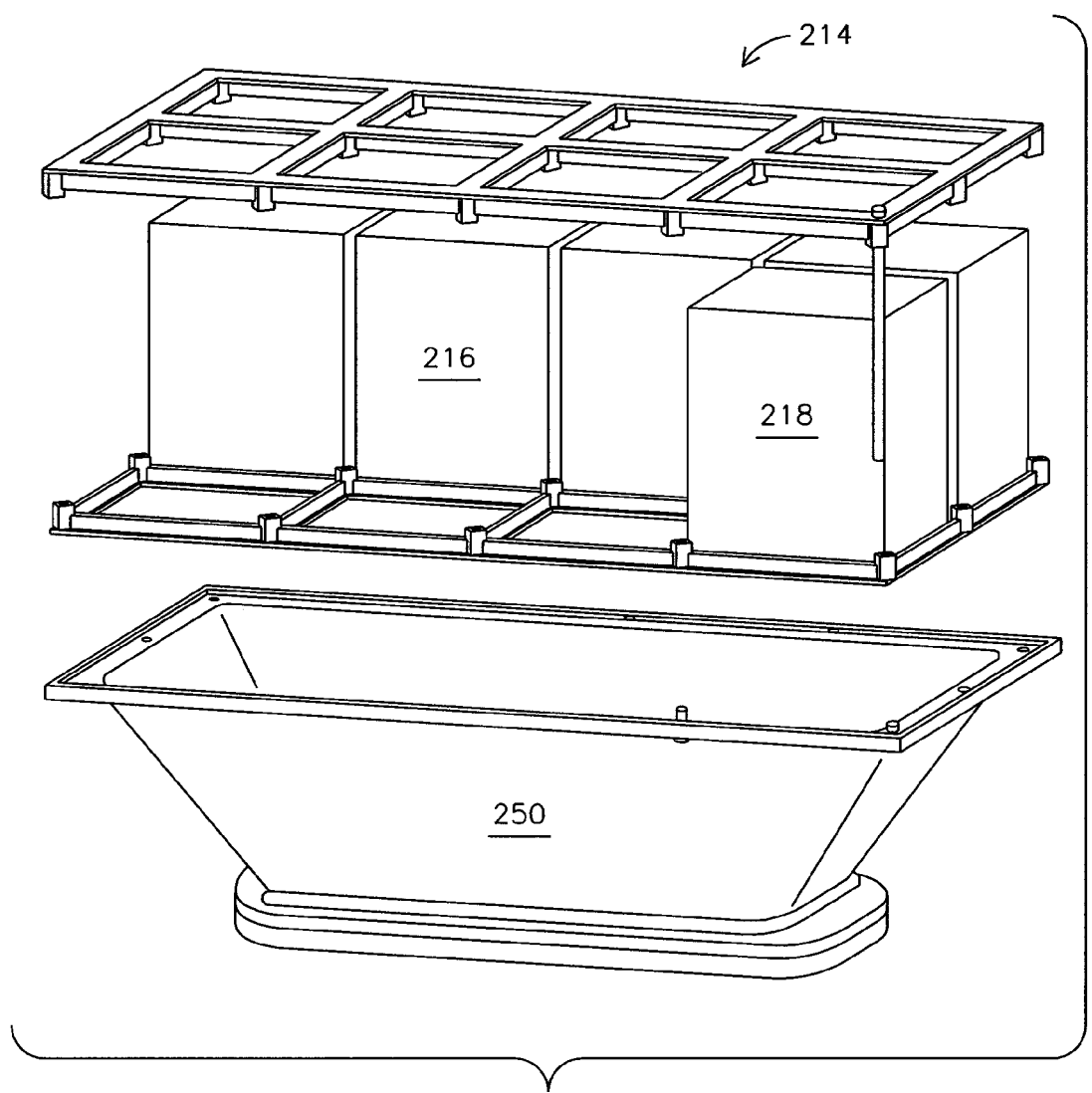
FIG. 6 depicts an isolated perspective view of an exemplary embodiment of a diesel particulate filter among a system for removing particulate matter from a diesel particulate filter in accordance with the present invention.

As illustrated in FIG. 5, the diesel particulate filter 214 may include a diesel particulate filter housing 248 for the plurality of diesel particulate filter units 216,218. As further illustrated in FIG. 5, the diesel engine exhaust gas 212 is output from a locomotive diesel engine 211 into a turbocharger 250 through a turbocharger exhaust manifold and subsequently from a turbocharger outlet into the diesel particulate filter 214. As further illustrated in FIG. 5, the system 210 may include a catalyst device 268 positioned between the turbocharger 250 and the diesel particulate filter 214, to receive the diesel engine exhaust gas 212 output from the turbocharger. The catalyst device 268 is configured to increase the temperature of the diesel engine exhaust gas 212 directed into the diesel particulate filter 214, and may be contained within the housing 248.

Figure 7:
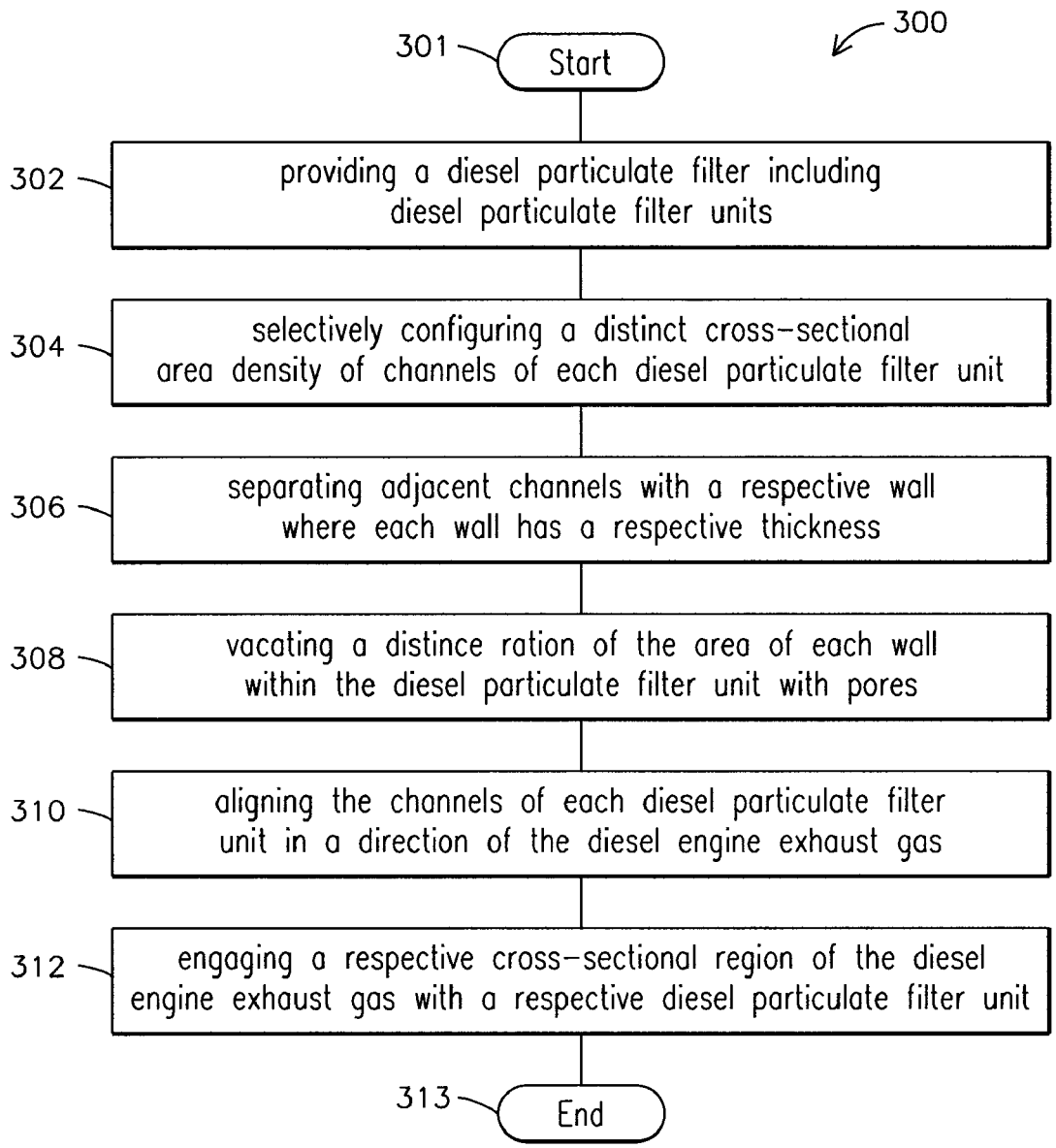
FIG. 7 depicts an exemplary embodiment of a method for reducing particulate matter emission in diesel engine exhaust gas in accordance with the present invention.

FIG. 7 illustrates an exemplary embodiment of a method 300 for reducing particulate matter emission in diesel engine exhaust gas 212. The method 300 begins at block 301, and includes providing (block 302) a diesel particulate filter 214 including a plurality of diesel particulate filter units 216,218. Providing (block 302) the diesel particulate filter 214 includes selectively configuring (block 304) a distinct cross-sectional area density of a plurality of channels 226 of each diesel particulate filter unit 216,218. Additionally, providing (block 302) the diesel particulate filter 214 further includes separating (block 306) adjacent channels 56,62 of the plurality of channels 226 with a respective wall 232, where each wall of the diesel particular filter unit 216 has a respective thickness 236. Additionally, providing (block 302) the diesel particulate filter 214 further includes vacating (block 308) a distinct ratio of the area of each wall 232 within the diesel particulate filter unit 216 with a plurality of pores 240. Additionally, providing (block 302) the diesel particulate filter 214 further includes aligning (block 310) the plurality of channels 226 of each diesel particulate filter unit 216 in a direction 230 of the diesel engine exhaust gas 212. The method 300 further includes engaging (block 312) a respective cross-sectional region 220,222 of the diesel engine exhaust gas 212 including particulate matter with a respective diesel particulate filter unit 216,218 of the diesel particulate filter 214, before ending at 313.

Although the embodiment of the system 210 to reduce particulate matter emission in diesel engine exhaust gas 212 involves the use of a diesel particulate filter 214, various other aftertreatment systems may be utilized to control the distribution of exhaust flow over the cross section of the flow path by using aftertreatment substrates with different flow characteristics at the various locations across the channel. The embodiments of the present invention all include aftertreatment systems which may be used to alter the flow characteristic over the cross-section using a number of techniques. As described in the system 210 above, varying the cross-sectional area density and/or wall thickness of a wall-flow particulate filter (i.e., a particulate filter with alternating blocked inlet-open outlet channels, and open inlet-blocked outlet channels) is one example of such an aftertreatment system. However, another exemplary embodiment of the present invention involves an aftertreatment system to combine a wall-flow particulate filter 214, as illustrated in FIGS. 12 and 13, with a flow-through particulate filter 214' (i.e., a diesel particulate filter with an open inlet-open outlet channel arrangement), also illustrated in FIGS. 12 and 13 to get a favorable flow and thermal characteristic. Additionally, in an additional exemplary embodiment of the present invention, the materials of the flow-through particulate filters 214' or the wall-flow particulate filters 214 may be combined in such a fashion to get such favorable flow and thermal characteristics, and such materials may include silicon carbide, cordierite, mullite, or metal mesh, among others.

Figure 9:
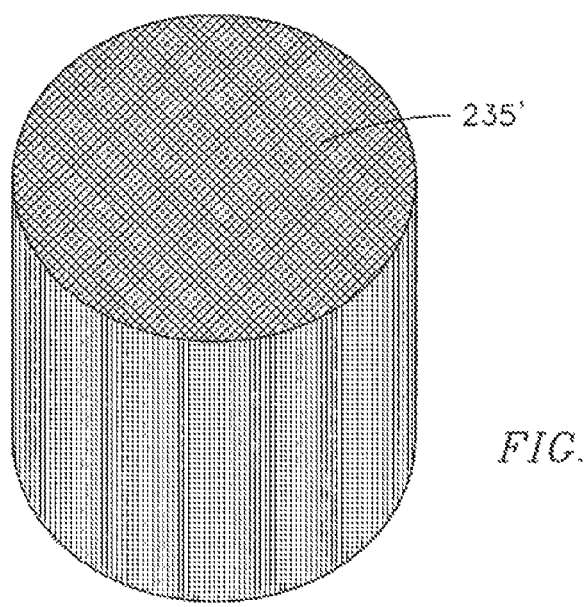
FIG. 9 depicts a perspective top view of an exemplary embodiment of an aftertreatment system for chemically altering the chemical emissions in engine exhaust gas.

In an additional exemplary embodiment of the present invention, an aftertreatment system may include various catalyst substrates, without diesel particulate filters, to control the distribution of exhaust flow over the cross section of the flow path, by chemically altering the diesel exhaust flow. For example, as illustrated in FIG. 9 a selective catalyst reduction (SCR) component 235' may be utilized in such an aftertreatment system, in which the in which the SCR 235' is coated with a catalyst component to reduce the levels of nitrous dioxide in the diesel exhaust gas. Table 1 (FIG. 14) and table 2 (FIG. 15) provide some exemplary parameters of some sample SCR components 235' used in an aftertreatment system, in which the "configuration" is two numbers, the first being the area density of the channels and the second being the wall thickness between the channels. The data in tables 1 and 2 is merely exemplary and the SCR component may be configured with parameters other than the data listed in tables 1 and 2 and still be within the scope of the present invention. Based upon the particular configuration of the diesel exhaust gas flow, the aftertreatment system may utilize a 400/7 SCR component in an area of higher exhaust flow and a 200/8 SCR component in an area of lower exhaust flow, for example.

Figure 10:
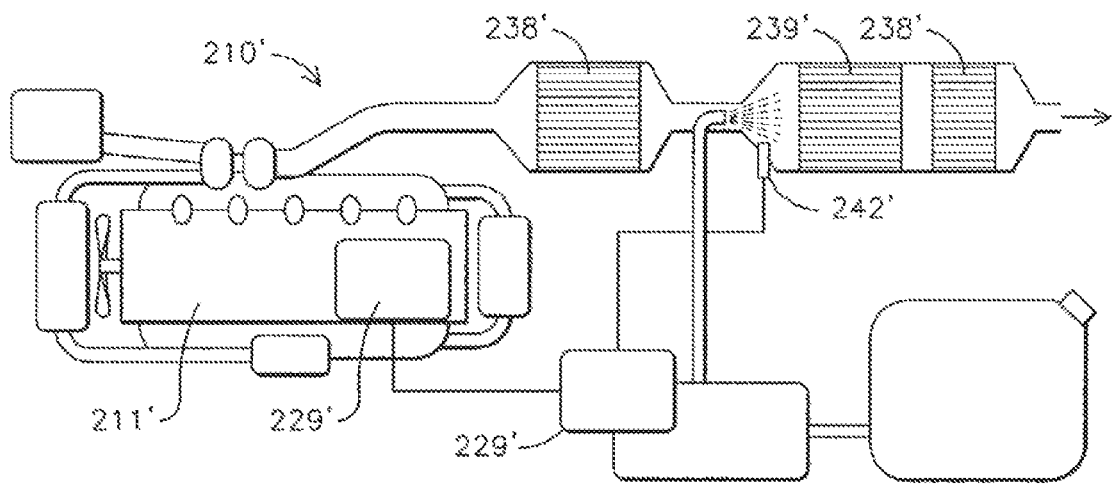
FIG. 10 depicts a schematic side view of an exemplary embodiment of an aftertreatment system for chemically altering the chemical emissions in engine exhaust gas.
Figure 11:
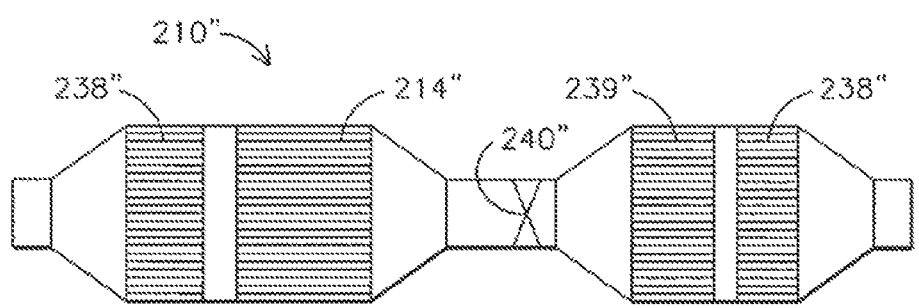
FIG. 11 depicts a schematic side view of an exemplary embodiment of an aftertreatment system for chemically altering the chemical emissions in engine exhaust gas.

In addition to an aftertreatment system with an SCR component 235', an exemplary aftertreatment system may include a diesel oxidization catalyst (DOC) component, which is utilized to reduce hydrocarbon emissions, such as unburned fuel and unburned oil, and CO emissions within the diesel exhaust gas, for example. Thus, an aftertreatment system may individually feature a DOC component and target separate chemical components (i.e., hydrocarbons/CO) than an aftertreatment system individually featuring a SCR component (i.e., nitrous dioxide). FIGS. 10 and 11 illustrate two distinct examples of aftertreatment systems including a DOC component 238' (FIG. 10), 238" (FIG. 11) and an SCR component 239' (FIG. 10), 239" (FIG. 11). As illustrated in the exemplary embodiments of FIGS. 10 and 11, a diesel particulate filter 214" is included in the aftertreatment system 210" of FIG. 11, but not included in the aftertreatment system 210' of FIG. 10. The aftertreatment system 210' further includes a diesel engine 211', an engine controller 229', and a temperature sensor 242' positioned adjacent to the SCR 239'. The aftertreatment system 210" further includes a urea solution 240". Before the SCR or DOC is utilized, the substrate is typically submerged or dipped into a liquid catalyst material, before it bonds to the substrate.

Figure 3:
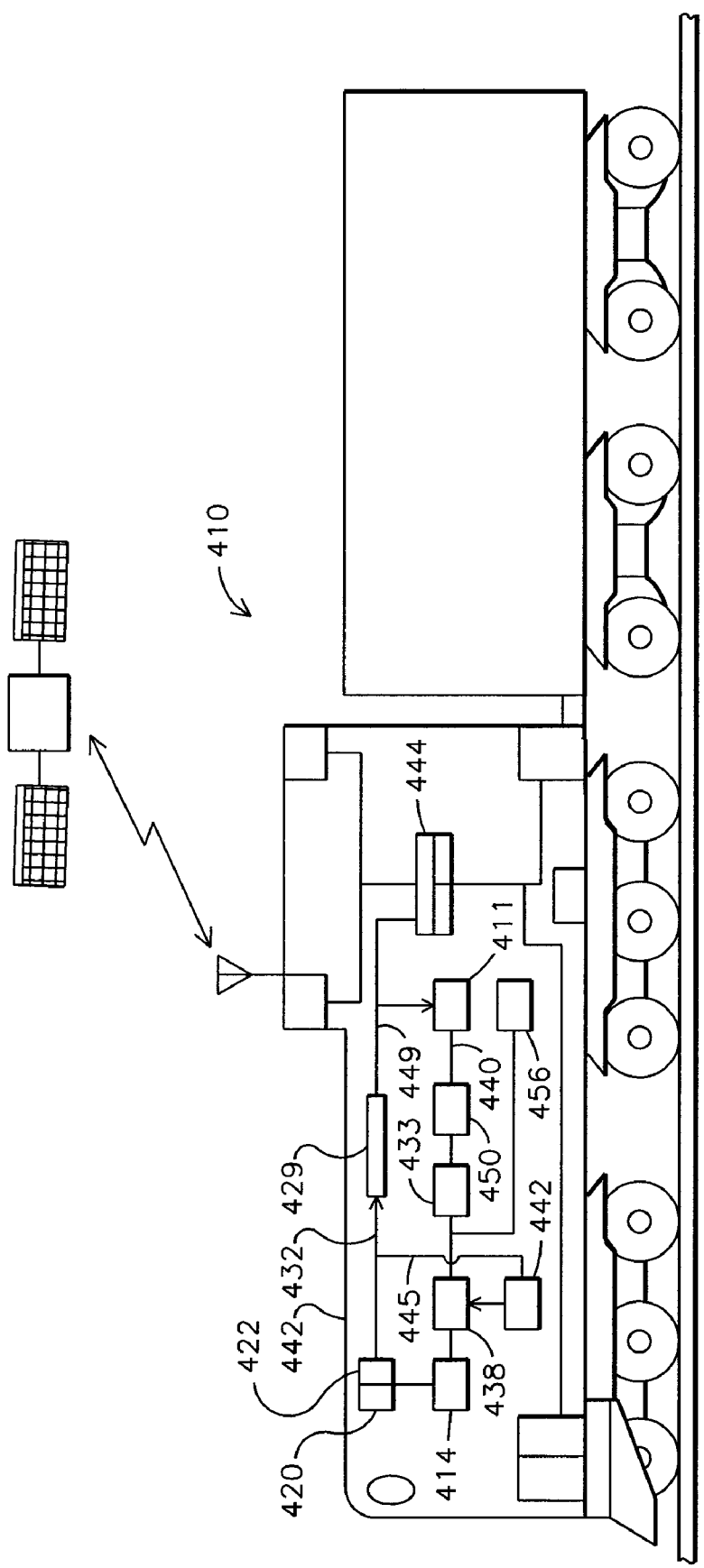
FIG. 3 depicts a schematic side view of an exemplary embodiment of a system for removing particulate matter from a diesel particulate filter in accordance with the present invention.

FIG. 3 illustrates a system 410 to remove particulate matter from a diesel particulate filter 414. Although FIG. 3 illustrates the system 410 employed on a locomotive 442, and coupled to a locomotive diesel engine 411, the system 410 may be utilized with vehicles other than locomotives, such as marine vehicles and off-highway vehicles, for example.

The diesel particulate filter 414 includes a plurality of diesel particulate filter units to filter the particulate matter from diesel engine exhaust gas received from a diesel engine 411. The diesel particulate filter 414 includes the plurality of diesel particulate filter units is described above in the previous embodiments. As illustrated in FIG. 3, the system 410 includes a pair of sensors 420,422 positioned adjacent to the diesel particulate filter 414 including one or more diesel particulate filter units. The sensors 420,422 are configured to determine the extent of particulate matter trapped within the diesel particulate filter 414. Although FIG. 3 illustrates a pair of sensors positioned adjacent to the diesel particulate filter, one sensor or more than two sensors may be so positioned.

The system 410 further includes an engine controller 429 coupled to the sensors 420,422 and the diesel engine 411. The sensors 420,422 are configured to output a first alert signal 432 to the engine controller 429 upon determining that the trapped particulate matter within the diesel particulate filter 414 exceeds a predetermined threshold. The predetermined threshold may be preset by the user prior to operation of the system 410. In an exemplary embodiment of the system, the predetermined threshold may be determined by a sensor for an equivalent to trapped particulate matter encompassing 50% of the allowable space within the diesel particulate filter, for example. As discussed below, the predetermined threshold is based upon several factors, including the conditions under which the trapped particulate matter will be removed, including temperature, duration of the removal process, use of assisting components, etc. The engine controller 429 is configured to increase the temperature of the diesel exhaust gas entering the diesel particulate filter 414 upon receiving the first alert signal 432.

In one embodiment of the system 410, the system further includes a turbocharger 450 including an exhaust manifold to receive the diesel engine exhaust gas from the diesel engine 411 and further including an outlet to output the diesel exhaust gas to the diesel particulate filter 414. The system 410 further includes an injector device 434 positioned between the turbocharger 450 and the diesel particulate filter 414, where the injector device is configured to selectively inject an adjustable amount of diesel fuel into the diesel engine exhaust gas exiting the outlet. Additionally, the system 410 further includes a reactive device 438 positioned between the injector device 434 and the diesel particulate filter 414. The reactive device 438 is configured to selectively ignite the adjustable amount of injected diesel fuel within the diesel engine exhaust gas upon entering an inlet of the reactive device 438 to increase the temperature of the diesel exhaust gas entering the diesel particulate filter 414. Various reactive devices may be used, such as catalyst devices, fuel burners, and any other devices appreciated by one of skill in the art.

As further illustrated in FIG. 3, the embodiment of the system 410 includes a temperature sensor 442 coupled to the engine controller 429 and positioned adjacent to the reactive device 438. The temperature sensor 442 is configured to determine the temperature of the diesel engine exhaust gas entering the reactive device 438. The temperature sensor 442 is further configured to transmit a second alert signal 445 to the engine controller 429 upon measuring a temperature lower than a first minimum threshold for the reactive device 438 to ignite the diesel fuel. The first minimum threshold depends on various factors, including the type of reactive device, including its material components, method of reacting with the fuel, ambient temperature, and other factors to determine the minimum temperature at which the reactive device will ignite the diesel fuel, thereby increasing the temperature of the diesel exhaust gas containing the ignited diesel fuel. In an exemplary embodiment of the system 410, the first minimum threshold is approximately 200 degrees Celsius, and the temperature of the diesel engine exhaust gas is lower than the first minimum threshold when the locomotive diesel engine 411 is in an idle state. However, the first minimum threshold may be any particular value consistent with a minimum temperature at which the reactive device ignites injected diesel fuel within the diesel exhaust gas.

The engine controller 429 is configured to increase the temperature of the diesel exhaust gas entering the reactive device 438 to greater than the first minimum threshold after the engine controller 429 has received the first alert signal 432 and the second alert signal 445. Thus, the engine controller 429 provides an initial increase in the temperature of the diesel exhaust gas, to the first minimum threshold, to enable a subsequent increase in the temperature of the diesel exhaust gas via ignition of the injected diesel fuel by the reactive device 438.

To initially increase the temperature of the diesel exhaust gas, the engine controller 429 may increase the temperature through a number of methods. For example, the engine controller 429 is configured to transmit an increase signal 449 to the diesel engine 411 to increase an artificial load on the diesel engine, and thereby cause an increase in the temperature of the diesel engine exhaust gas entering the reactive device 438. Thus, upon the artificial load being placed on the diesel engine 411, an increased temperature diesel exhaust gas would be expelled from the diesel engine 411, and passed through the turbocharger 450 and injector 434 to the reactive device 438. Alternatively, the engine controller 429 may be configured to electrically couple an alternator 456 of the diesel engine 411 to the turbocharger outlet 440 to cause an increase in the temperature of the diesel engine exhaust gas entering the reactive device 438. Alternatively, in an exemplary embodiment of the system 410, the alternator 456 may be coupled to the diesel particulate filter 414, and electrically heat the diesel particulate filter, for example.

As discussed in the previous embodiments of the present invention and illustrated in FIG. 12, each diesel particulate filter unit 216,218 of the diesel particulate filter 414 includes a plurality of channels 226 oriented parallel with the flow direction 230 of the diesel engine exhaust. The pair of sensors 420,422 is a pair of pressure sensors 420,422 positioned on opposing sides of the plurality of channels 226 of the diesel particulate filter unit 216 (FIG. 12). The pressure sensors 420,422 are configured to transmit the first alert signal 432 to the engine controller 429 upon measuring a pressure difference across the plurality of channels 226 exceeding a predetermined pressure threshold. As the trapped particulate matter accumulates within the walls of the diesel particulate filter, as discussed in the previous embodiments, the pressure difference across a channel 226, as measured by the pressures sensors 420,422, increases. The predetermined pressure threshold may be selectively determined based upon a number of factors, including, for example, the time duration to remove the trapped particulate matter, the method of removing the trapped particulate matter, and the temperature of removing the trapped particulate matter.

After the engine controller 429 increases the temperature of the diesel exhaust gas entering the reactive device 438 above the first minimum threshold, the temperature sensor 442 measures this increase in temperature and transmits a third alert signal to the engine controller 429. Upon receiving the first alert signal 432 from the pressures sensors 420,422 and the third alert signal from temperature sensor 442, the engine controller 429 transmits an ignite signal to the reactive device 438 to ignite the injected fuel within the diesel engine exhaust to increase the temperature of diesel engine exhaust passing through an outlet of the reactive device 438 and into an inlet of the diesel particulate filter 414.

The reactive device 438 may be a catalyst device 438 and include an internal catalyst component which facilitates igniting the injected fuel of the diesel exhaust gas and increases the temperature of the diesel exhaust gas at a temperature lower than in an absence of the catalyst device 438. During the ignition of the injected fuel within the diesel exhaust gas, the temperature of the diesel exhaust gas entering the catalyst device 438 increases to a first high temperature threshold to facilitate oxidization of the trapped particulate matter within the plurality of diesel particulate filter 414. This oxidization of the trapped particulate matter within the diesel particulate filter 414 at the first high temperature threshold is known to one of skill in the art as active regeneration. The trapped particulate matter may include a carbon material which oxidizes at the first high temperature threshold. The temperature of the diesel exhaust gas may be initially increased to the first minimum threshold for ignition of the injected fuel within the diesel exhaust gas using methods other than those discussed above. Additionally, the temperature of the diesel exhaust gas may be increased through active generation to the first high temperature threshold using various methods other than the catalyst component, such as using a fuel burner device, for example. In an exemplary embodiment of the present invention, the first high temperature threshold may be approximately 550 degrees Celsius, the oxidization may occur within an approximate temperature range of 550-600 degrees Celsius and the catalyst may be formed from cordierite, silicon carbide, mullite, metallic material, or any other relevant material or combination of materials. However, other first high temperature threshold values and oxidization temperature ranges are possible, based on various factors including the material used, the amount of particulate matter to be oxidized, and the time duration of the regeneration, for example. Those elements not discussed herein, are similar to those elements discussed in the previous embodiments, with four-hundred scale number reference notation, and require no further discussion herein.

Figure 4:
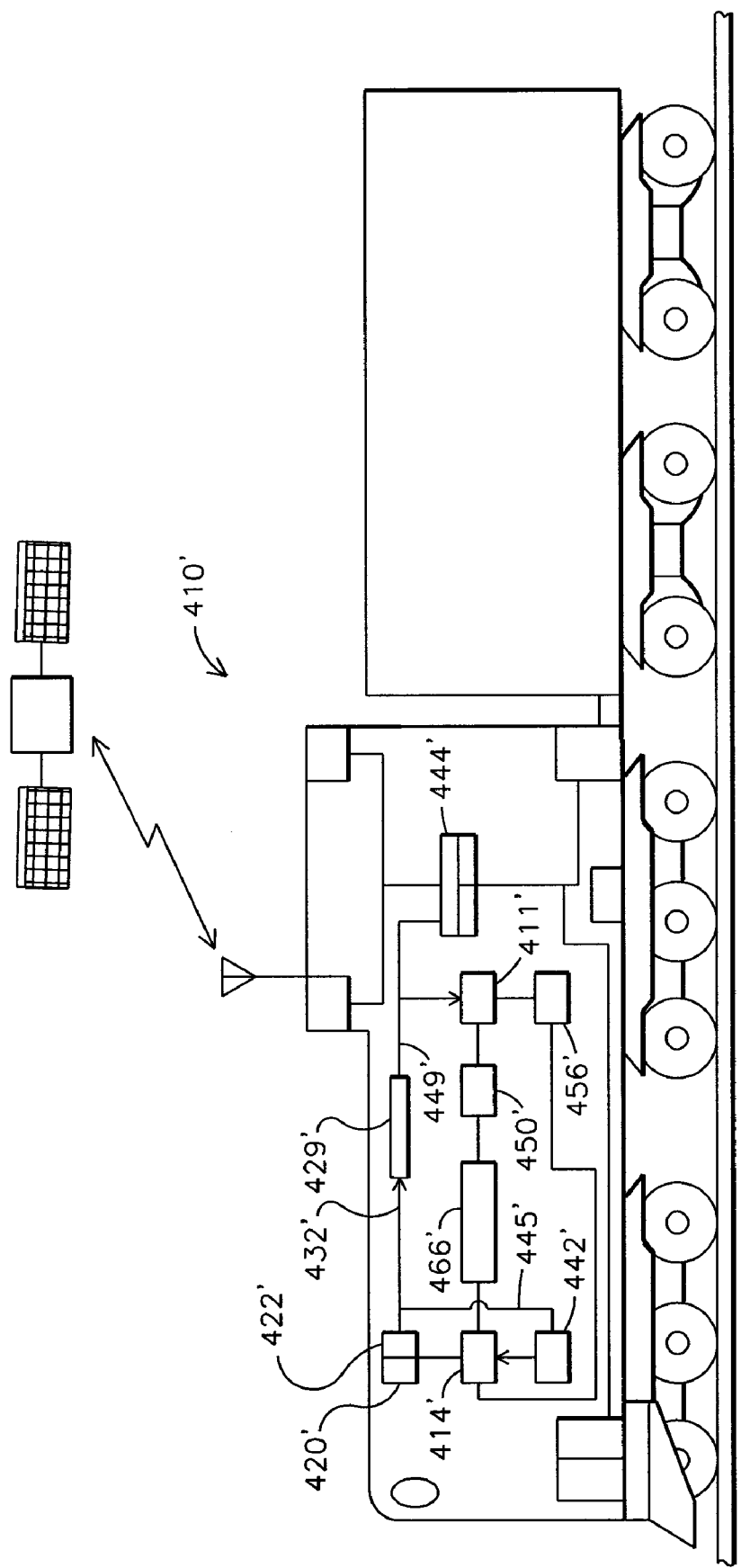
FIG. 4 depicts a schematic side view of an exemplary embodiment of a system for removing particulate matter from a diesel particulate filter in accordance with the present invention.

FIG. 4 illustrates an additional exemplary embodiment of a system 410' of the present invention. Unlike the embodiment of the system 410 discussed above and illustrated in FIG. 3, in which active regeneration is used to oxidize trapped particulate matter from the diesel particulate filter, the system 410' discloses a passive regeneration process to oxidize trapped particulate matter from the diesel particulate filter.

The system 410' illustrated in FIG. 4 includes a turbocharger 450' including an exhaust manifold to receive the diesel engine exhaust gas from the diesel engine 411' and an outlet to output the diesel exhaust gas to the diesel particulate filter 414'. As discussed in the previous embodiment, the diesel particulate filter 414' includes a plurality of diesel particulate filter units including a plurality of channels oriented parallel with the flow direction of the diesel engine exhaust. Additionally, a pair of pressures sensors 420',422' are positioned on opposing sides of the plurality of channels of the diesel particulate filter 414'. The pressure sensors 420', 422' are configured to transmit the first alert signal 432' to the engine controller 429' upon measuring a pressure difference across the channels which exceeds a predetermined pressure threshold, as discussed in the previous embodiments.

As further illustrated in the exemplary embodiment of FIG. 4, a temperature sensor 442' is coupled to the engine controller 429' and positioned adjacent to the diesel particulate filter 414' including the plurality of diesel particulate filter units. The temperature sensor 442' is configured to determine the temperature of the diesel engine exhaust gas entering the diesel particulate filter 414' including the plurality of particulate filter units. Additionally, the temperature sensor 442' is further configured to transmit a second alert signal 445' to the engine controller 429' upon measuring a temperature lower than a second maximum threshold for the diesel particulate filter 414'. As discussed in further detail below, the second maximum threshold is the minimum temperature of the diesel exhaust gas at which the trapped particulate matter within the diesel particulate filter 414' will oxidize in the presence of nitrous dioxide. The engine controller 429' is configured to increase the temperature of the diesel exhaust gas entering the diesel particulate filter 414' to the second maximum threshold upon the engine controller 429' receiving the first alert signal 432' and the second alert signal 445'.

To increase the temperature of the diesel exhaust gas entering the diesel particulate filter 414', the engine controller 429' is configured to transmit an increase signal 449' to the diesel engine 411' to increase an artificial load on the diesel engine to cause an increase in the temperature of the diesel engine exhaust gas entering the diesel particulate filter 414'. Alternatively, the engine controller 429' is configured to electrically couple an alternator 456' of the diesel engine 411' to the turbocharger output to cause an increase in the temperature of the diesel engine exhaust gas entering the diesel particulate filter 414'. Although FIG. 4 illustrates the above-described arrangements to increase the temperature of the diesel exhaust gas, various other arrangements and methods may be utilized to increase the temperature of the diesel exhaust gas entering the diesel particulate filter. In an exemplary embodiment of the present invention, the second maximum threshold may be approximately 250 degrees Celsius and the oxidization in the presence of nitrous dioxide may occur in the approximate temperature range of 250-350 degrees Celsius. However, other second maximum threshold values and oxidization temperature ranges are possible, based on various factors including the material used, the amount of particulate matter to be oxidized, and the time duration of the regeneration, for example. Additionally, in the illustrated embodiment of FIG. 4, a nitrous dioxide filter 466' is positioned downstream from the particulate filter 414' to reduce the presence/concentration of nitrous dioxide in the diesel exhaust gas which enters the diesel particulate filter and optimize the passive regeneration process. However, the nitrous dioxide filter is not required and may be removed. Those elements not discussed herein, are similar to those elements discussed in the previous embodiments, with four-hundred prime scale number reference notation, and require no further discussion herein.

Figure 8:
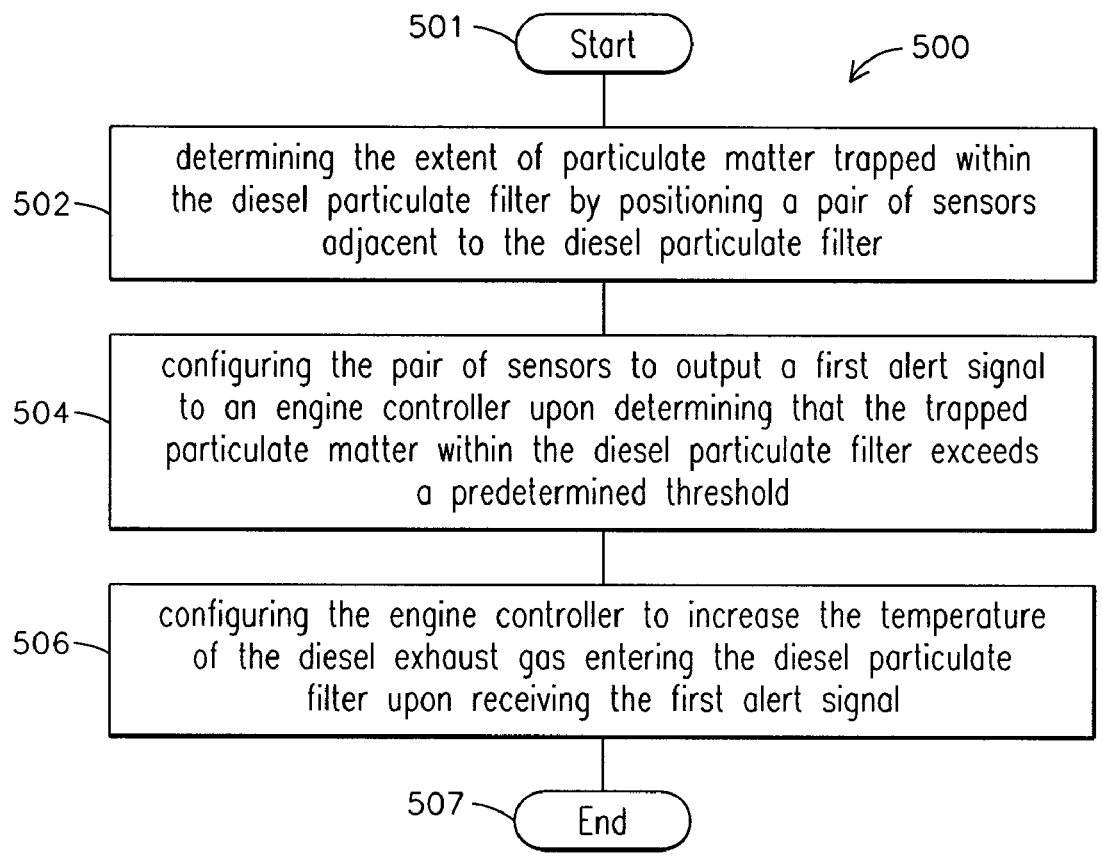
FIG. 8 depicts an exemplary embodiment of a method for removing particulate matter from a diesel particulate filter in accordance with the present invention.

FIG. 8 illustrates an exemplary embodiment of a method 500 for removing particulate matter from a diesel particulate filter 414. The diesel particulate filter 414 includes a plurality of diesel particulate filter units to filter the particulate matter from diesel engine exhaust gas received from a diesel engine 411. The method 500 begins at block 501 by determining (block 502) the extent of particulate matter trapped within the diesel particulate filter 414 by positioning a pair of sensors 420,422 adjacent to the diesel particulate filter units of the diesel particulate filter 414. The method 500 further includes configuring (block 504) the pair of sensors 420,422 to output a first alert signal 432 to an engine controller 429 upon determining that the trapped particulate matter within the diesel particulate filter 414 exceeds a predetermined threshold. The method 500 further includes configuring (block 506) the engine controller 429 to increase the temperature of the diesel exhaust gas entering the diesel particulate filter 414 upon receiving the first alert signal 432, before ending at 507.

Based on the foregoing specification, the above-discussed embodiments of the invention may be implemented using computer programming or engineering techniques including computer software, firmware, hardware or any combination or subset thereof, wherein the technical effect is to remove particulate matter from a diesel particulate filter Any such resulting program, having computer-readable code means, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system of the method embodiment of the invention. An apparatus for making, using or selling embodiments of the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody those discussed embodiments the invention.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A system for reducing particulate matter emission in engine exhaust gas, said system comprising:
    a first particulate filter including a plurality of particulate filter units configured to engage a respective cross-sectional region of said engine exhaust gas including particulate matter, each particulate filter unit comprising
    a plurality of channels aligned in a flow direction of said engine exhaust gas, said channels being selectively configured with a varying cross-sectional area density, which varies based upon an expected cross-sectional distribution of a flow rate of the exhaust gas passing through the channels in the first particulate filter, wherein said plurality of channels of each particular filter unit comprises:
        a plurality of first channels having a blocked inlet and an open outlet; and
        a plurality of second channels having an open inlet and a blocked outlet,
        each first channel being positioned adjacent to a second channel, and each
        second channel being positioned adjacent to a first channel;
    a plurality of walls separating adjacent channels of said plurality of channels, said walls having a varying thickness, which varies based upon the expected cross-sectional distribution of the flow rate of the exhaust gas; and
    a plurality of pores within said plurality of walls trapping particulates in the exhaust gas, said pores being configured to vacate a varying ratio of the area of said walls, wherein said ratio varies based upon the expected cross-sectional distribution of the flow rate of the exhaust gas;
    a second particulate filter coupled to receive exhaust gas from the first particulate filter, the second particulate filter comprising a plurality of particulate filter units configured to engage a respective cross-sectional region of the exhaust gas from the first particulate filter, each particulate filter unit of said second particulate filter comprising a flow-through unit, each particulate filter unit comprising a plurality of channels aligned in a flow direction of the exhaust gas from the first particulate filter, said channels being selectively configured with a varying cross-sectional area density, which varies based upon an expected cross-sectional distribution of a flow rate of the exhaust gas passing through the channels in the second particulate filter;

a plurality of walls separating adjacent channels of said plurality of channels, said walls having a varying thickness, which varies based upon the expected cross-sectional distribution of the flow rate of the exhaust gas passing through the channels in the second particulate filter, wherein for at least some of particulate filter units of the first and second particulate filters, at least one of said cross-sectional area density of said plurality of channels, said respective wall thickness and said ratio of pores within said walls is selected to optimize a flow and/or thermal characteristic of a filter coupling arrangement comprising a combination of said first and second particulate filters.

* * * * *